United States Patent
Janapaneedi et al.

(10) Patent No.: US 9,435,258 B2
(45) Date of Patent: *Sep. 6, 2016

(54) SYSTEM AND METHOD FOR HEATING COMBUSTOR FUEL

(71) Applicant: General Electric Company, Schenectady, NY (US)

(72) Inventors: Durgaprasad Janapaneedi, Bangalore (IN); Korey Frederic Rendo, Greer, SC (US); Dean Matthew Erickson, Simpsonville, SC (US); Timothy Russell Bilton, Simpsonville, SC (US); Christina Renee Pompey, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 696 days.

This patent is subject to a terminal disclaimer.

(21) Appl. No.: 13/651,813

(22) Filed: Oct. 15, 2012

(65) Prior Publication Data

US 2014/0102105 A1    Apr. 17, 2014

(51) Int. Cl.
*F02C 3/34* (2006.01)
*F02C 7/224* (2006.01)
*F02C 6/06* (2006.01)

(52) U.S. Cl.
CPC . *F02C 3/34* (2013.01); *F02C 6/06* (2013.01); *F02C 7/224* (2013.01)

(58) Field of Classification Search
CPC ............ F02C 3/34; F02C 6/06; F02C 7/224
USPC .................................. 60/736, 39.5
See application file for complete search history.

(56) References Cited

U.S. PATENT DOCUMENTS

| 3,334,486 | A | * | 8/1967 | Scholz | ............................ 60/736 |
| 3,675,426 | A | * | 7/1972 | Vidal et al. | ................ 60/39.182 |
| 3,942,765 | A | * | 3/1976 | Henrickson | ................... 366/336 |
| 4,204,401 | A | * | 5/1980 | Earnest | ........................ 60/39.52 |
| 5,845,481 | A |   | 12/1998 | Briesch et al. | |
| 5,863,508 | A | * | 1/1999 | Lachman et al. | ............... 60/274 |
| 6,082,092 | A |   | 7/2000 | Vandervort | |
| 6,105,370 | A |   | 8/2000 | Weber | |
| 6,202,402 | B1 |  | 3/2001 | Sattelmayer | |
| 6,253,554 | B1 |  | 7/2001 | Kobayashi et al. | |
| 6,269,626 | B1 |  | 8/2001 | Kim | |

(Continued)

FOREIGN PATENT DOCUMENTS

CN    101644178 A    2/2010

OTHER PUBLICATIONS

Unofficial English Translation of Chinese Office Action issued in connection with corresponding CN Application No. 201310480458.7 on Mar. 2, 2016.

*Primary Examiner* — Ted Kim
(74) *Attorney, Agent, or Firm* — Dority & Manning, PA

(57) ABSTRACT

A system for heating combustor fuel includes a turbine exhaust plenum and a heat exchanger downstream from the turbine exhaust plenum. The heat exchanger has an exhaust inlet, an exhaust outlet, a fuel inlet, and a fuel outlet. An exhaust recirculation plenum has a recirculation inlet connection downstream from the exhaust outlet and a recirculation outlet connection upstream from the exhaust inlet. The system further includes structure for controlling a recirculated exhaust flow from the exhaust outlet into the exhaust recirculation plenum.

14 Claims, 3 Drawing Sheets

(56) References Cited

U.S. PATENT DOCUMENTS

| | | |
|---|---|---|
| 7,007,487 B2 * | 3/2006 | Belokon et al. ............. 60/39.52 |
| 7,467,519 B2 | 12/2008 | Raybold et al. |
| 7,565,792 B2 | 7/2009 | Tanaka et al. |
| 7,874,156 B2 | 1/2011 | Wang et al. |
| 8,015,793 B2 | 9/2011 | Austin et al. |
| 8,020,366 B2 | 9/2011 | Cowan |
| 8,186,142 B2 | 5/2012 | Narayan et al. |
| 8,186,164 B2 | 5/2012 | Cowan |
| 8,534,073 B2 | 9/2013 | Garcia-Crespo et al. |
| 8,677,729 B2 * | 3/2014 | Bilton et al. .................... 60/736 |
| 2008/0155984 A1 | 7/2008 | Liu et al. |
| 2009/0229271 A1 | 9/2009 | De Ruyck et al. |
| 2009/0235634 A1 * | 9/2009 | Wang et al. ................... 60/39.5 |
| 2010/0024429 A1 * | 2/2010 | Zhang et al. ................... 60/772 |
| 2010/0101543 A1 * | 4/2010 | Garcia-Crespo et al. ... 60/605.2 |
| 2012/0036863 A1 * | 2/2012 | Kirzhner .................. F02C 7/22 60/776 |
| 2014/0102071 A1 | 4/2014 | Ball, Jr. et al. |

* cited by examiner

SYSTEM AND METHOD FOR HEATING COMBUSTOR FUEL

FIELD OF THE INVENTION

The present invention generally involves a system and method for heating combustor fuel.

BACKGROUND OF THE INVENTION

Gas turbines are widely used in industrial and commercial operations. A typical gas turbine includes an inlet section, a compressor section, a combustion section, a turbine section, and an exhaust section. The inlet section cleans and conditions a working fluid (e.g., air) and supplies the working fluid to the compressor section. The compressor section increases the pressure of the working fluid and supplies a compressed working fluid to the combustion section. The combustion section mixes fuel with the compressed working fluid and ignites the mixture to generate combustion gases having a high temperature and pressure. The combustion gases flow to the turbine section where they expand to produce work. For example, expansion of the combustion gases in the turbine section may rotate a shaft connected to a generator to produce electricity.

The fuel supplied to the combustion section may be a liquid fuel, a gaseous fuel, or a combination of liquid and gaseous fuels. Heating the fuel prior to combustion generally may enhance the efficiency of the combustion and reduce undesirable emissions of nitrous oxides ($NO_x$). In addition, the combustion gases exiting the turbine section generally have considerable residual heat that may be extracted prior to discharge to the environment to further enhance the overall efficiency of the gas turbine. As a result, a system and method for heating the fuel using the combustion gases exiting the turbine section would be useful.

BRIEF DESCRIPTION OF THE INVENTION

Aspects and advantages of the invention are set forth below in the following description, or may be obvious from the description, or may be learned through practice of the invention.

One embodiment of the present invention is a system for heating combustor fuel that includes a turbine exhaust plenum and a heat exchanger downstream from the turbine exhaust plenum. The heat exchanger has an exhaust inlet, an exhaust outlet, a fuel inlet, and a fuel outlet. An exhaust recirculation plenum has a recirculation inlet connection downstream from the exhaust outlet and a recirculation outlet connection upstream from the exhaust inlet. The system further includes means for controlling a recirculated exhaust flow from the exhaust outlet into the exhaust recirculation plenum.

Another embodiment of the present invention is a system for heating combustor fuel that includes a turbine exhaust plenum and a heat exchanger downstream from the turbine exhaust plenum. The heat exchanger has an exhaust inlet, an exhaust outlet, a fuel inlet, and a fuel outlet. An exhaust recirculation plenum has a recirculation inlet connection downstream from the exhaust outlet and a recirculation outlet connection upstream from the exhaust inlet, and a mixing plenum is at the recirculation outlet connection with a baffle in the mixing plenum.

In yet another embodiment, a gas turbine includes a compressor, a combustor downstream from the compressor, and a turbine downstream from the combustor. A turbine exhaust plenum is downstream from the turbine, and a heat exchanger is downstream from the turbine exhaust plenum. The heat exchanger has an exhaust inlet, an exhaust outlet, a fuel inlet, and a fuel outlet. An exhaust recirculation plenum has a recirculation inlet connection downstream from the exhaust outlet and a recirculation outlet connection upstream from the exhaust inlet. The gas turbine further includes means for controlling a recirculated exhaust flow from the exhaust outlet to the exhaust recirculation plenum.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
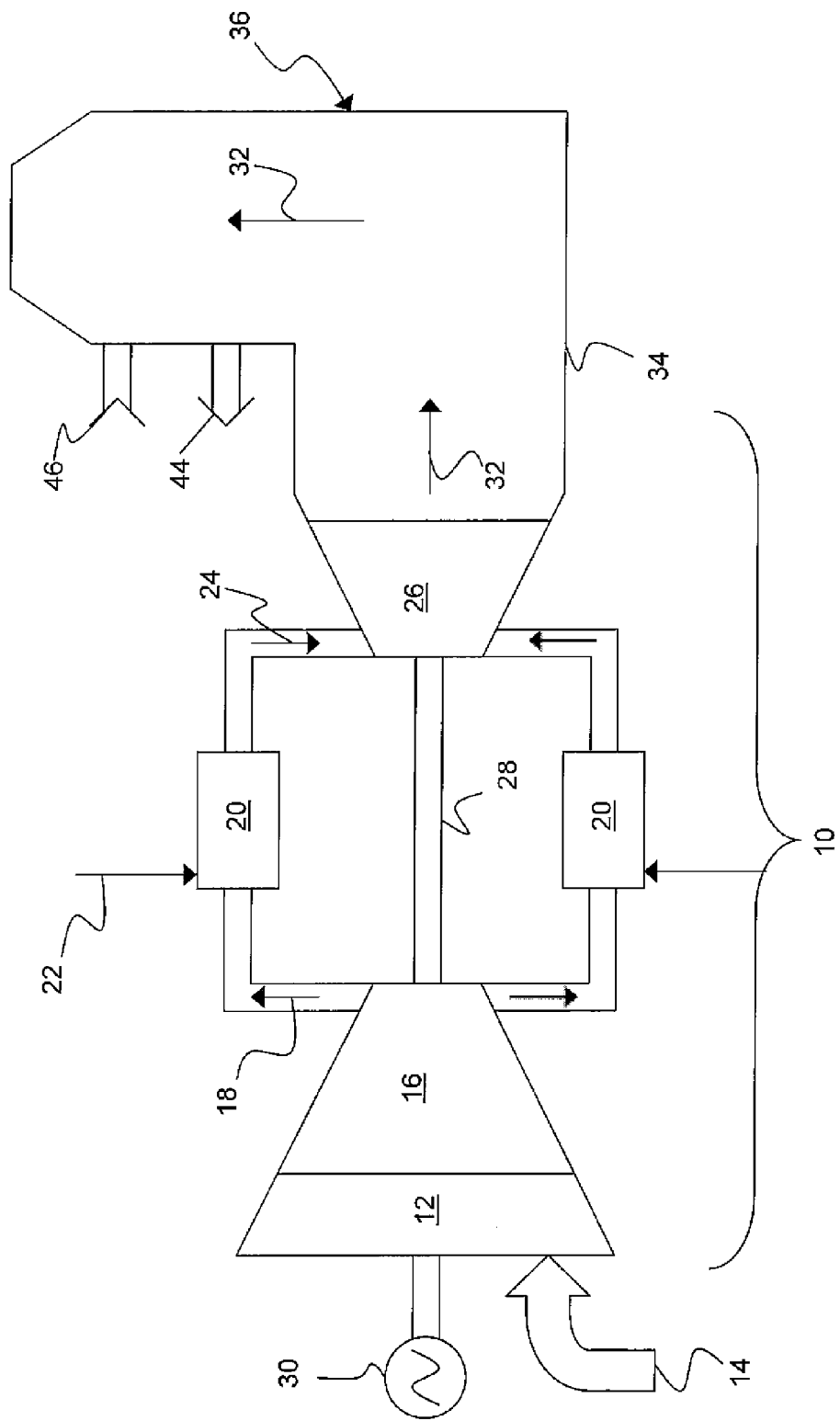
FIG. 1 is a block diagram of an exemplary gas turbine within the scope of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a system and method for heating combustor fuel. The system generally includes a heat exchanger downstream from a turbine exhaust plenum that allows turbine exhaust gases to transfer residual heat to the combustor fuel. The system may further include an exhaust recirculation plenum, a mixing plenum, and/or means for controlling a recirculated exhaust flow from the heat exchanger to attemperate the turbine exhaust gases prior to entering the heat exchanger. Although particular embodiments of the present invention may be described and illustrated generally in the context of a gas turbine, one of ordinary skill in the art will readily appreciate from the teachings herein that embodiments of the present invention may be used with other turbo-machines, and the present invention is not limited to gas turbines unless specifically recited in the claims.

FIG. 1 provides a functional block diagram of an exemplary gas turbine 10 used to generate electrical power according to one embodiment of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor 16, and the compressor 16 progressively imparts kinetic energy to the working fluid 14 to produce a compressed working fluid 18 at a highly energized state. The compressed working fluid 18 flows to one or more combustors 20 where it mixes with a fuel 22 before combusting to produce combustion gases 24 having a high temperature and pressure. The combustion gases 24 flow through a turbine 26 to produce work. For example, a shaft 28 may connect the turbine 26 to the compressor 16 so that operation of the turbine 26 drives the compressor 16 to produce the compressed working fluid 18. Alternately or in addition, the shaft 28 may connect the turbine 26 to a generator 30 for producing electricity. Exhaust gases 32 from the turbine 26 flow through a turbine exhaust plenum 34 that may connect the turbine 26 to an exhaust stack 36 downstream from the turbine 26. The exhaust stack 36 may include, for example, a heat recovery steam generator (not shown) for cleaning and extracting additional heat from the exhaust gases 32 prior to release to the environment.

Figure 2:
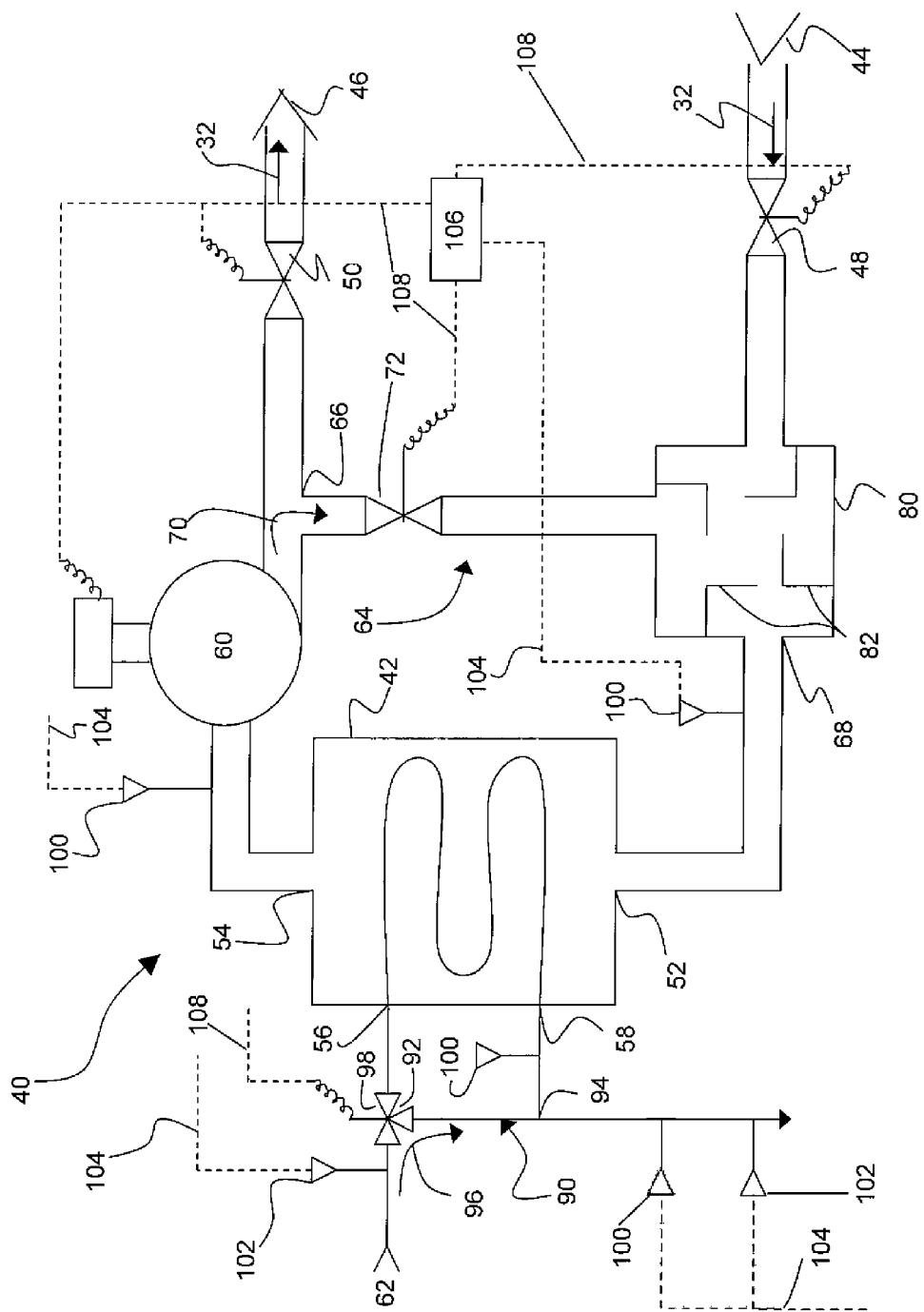
FIG. 2 is a block diagram of a system for heating combustor fuel according to a first embodiment of the present invention.

The fuel 22 supplied to the combustors 20 may include any available fuel known to one of ordinary skill in the art. Possible fuels 22 may include, for example, blast furnace gas, coke oven gas, natural gas, methane, vaporized liquefied natural gas (LNG), hydrogen, syngas, butane, propane, olefins, diesel, petroleum distillates, and combinations thereof. In general, heating liquid fuel prior to combustion enhances mixing with the compressed working fluid 18 and allows more complete combustion of leaner fuel-air mixtures. FIG. 2 provides a block diagram of a system 40 for heating the combustor fuel 22 according to a first embodiment of the present invention. As shown in FIGS. 1 and 2, the system 40 may connect to the exhaust plenum 34 and/or exhaust stack 36 to divert a portion of the exhaust gases 32 through a heat exchanger 42 and back to the exhaust plenum 34 and/or exhaust stack 36. Specifically, the system 40 may include an exhaust supply connection 44 to the exhaust plenum 34 and an exhaust return connection 46 to the exhaust plenum 34, with corresponding exhaust gas supply and return valves 48, 50 at each connection 44, 46 to control or regulate the amount of exhaust gases 32 diverted from the exhaust plenum 34 and/or exhaust stack 36. The exhaust gas supply and return valves 48, 50 may be any type of globe valve, gate valve, butterfly valve, ball valve, damper, or other variable orifice known in the art for alternately permitting or preventing fluid flow.

The heat exchanger 42 generally includes an exhaust inlet 52, an exhaust outlet 54, a fuel inlet 56, and a fuel outlet 58. A blower 60 in the system 40 may augment the differential pressure of the exhaust gases 32 across the heat exchanger 42 so that the exhaust gases 32 may flow through the heat exchanger 42 from the exhaust inlet 52 to the exhaust outlet 54. In particular embodiments, the blower 60 may have variable speeds to adjust the flow rate and/or differential pressure of the exhaust gases 32 across the heat exchanger 42. Fuel 22 from a fuel supply system 62 may similarly flow through the heat exchanger 42 from the fuel inlet 56 to the fuel outlet 58. In this manner, the heat exchanger 42 may transfer residual heat from the exhaust gases 32 to the fuel 22 to heat the fuel 22 to a desired temperature.

The temperature of the fuel 22 entering the heat exchanger 42 may be above, below, or equal to ambient temperature, and the temperature of the exhaust gases 32 flowing through the exhaust plenum 34 may be 1,100 degrees Fahrenheit or more. This large temperature difference may create undesirable thermal stresses in the heat exchanger 42. As shown in FIG. 2, the system 40 may include an attemperator in the form of an exhaust recirculation plenum 64 to reduce the temperature of the exhaust gases 32 entering the exhaust inlet 52. A recirculation inlet connection 66 is downstream from the exhaust outlet 54 and between the exhaust outlet 54 and the exhaust gas return connection 46. A recirculation outlet connection 68 is upstream from the exhaust inlet 52 and between the exhaust inlet 52 and the exhaust supply connection 44. The system 40 may further include means for controlling a recirculated exhaust flow 70 from the exhaust outlet 54 into the exhaust recirculation plenum 64. The function of the means is to control or regulate the amount of recirculated exhaust flow 70 that flows from the exhaust outlet 54 and enters the exhaust recirculation plenum 64. The structure for controlling the recirculated exhaust flow 70 from the exhaust outlet 54 into the exhaust recirculation plenum 64 may include any combination of one or more control valves, throttle valves, dampers, and/or sensors known to one of ordinary skill in the art for regulating fluid flow in a system. For example, in the particular embodiment shown in FIG. 2, the structure for controlling the recirculated exhaust flow 70 from the exhaust outlet 54 into the exhaust recirculation plenum 64 is a throttle valve 72 in the exhaust recirculation plenum 64. The throttle valve 72 may be a globe valve, gate valve, butterfly valve, ball valve, damper, or other variable orifice known in the art for controlling fluid flow. Alternately or in addition, one or more of the exhaust gas supply and/or return valves 48, 50 may assist in controlling or regulating the amount of exhaust gases 32 diverted from the exhaust plenum 34 and/or exhaust stack 36 that may be available for flowing through the exhaust recirculation plenum 64.

As shown in FIG. 2, the system 40 may further include a mixing plenum 80 at the recirculation outlet connection 68. The mixing plenum 80 may be a chamber, tank, or other suitable volume with one or more baffles 82 therein and/or downstream from the mixing plenum 80 to enhance mixing between the relatively hotter exhaust gases 32 flowing from the exhaust plenum 34 and/or exhaust stack 36 and the relatively cooler recirculated exhaust flow 70 flowing through the recirculation plenum 64. In this manner, the combination of the exhaust recirculation plenum 64 and/or the mixing plenum 80 may attemperate the temperature of the exhaust gases 32 before they reach the exhaust inlet 52 of the heat exchanger 42 to reduce thermal stresses across the heat exchanger 42. In addition, the exhaust recirculation plenum 64 and/or the mixing plenum 80 may also keep the exhaust gas 32 temperature below the auto-ignition temperature associated with gaseous fuels and below the coking temperature associated with liquid fuels.

Referring to the left side of FIG. 2, the fuel 22 flows from the fuel supply system 62 through the fuel inlet and outlet 56, 58 of the heat exchanger 42 to pick up residual heat from the exhaust gases 32 flowing through the heat exchanger 42. The type of fuel 22, its associated Wobbe Index for gas fuel, and/or its viscosity for liquid fuel are factors that may be used to determine the desired temperature for the fuel 22 for enhancing combustion. As shown in FIG. 2, a fuel bypass plenum 90 allows a portion of the fuel 22 to bypass the heat exchanger 42 to achieve a desired temperature for the fuel 22. The fuel bypass plenum 90 may include a fuel bypass inlet 92 upstream from the fuel inlet 56 to the heat exchanger 42 and a fuel bypass outlet 94 downstream from the fuel outlet 58 from the heat exchanger 42.

The system 40 may further include means for controlling a bypass fuel flow 96 into the fuel bypass plenum 90. The function of the means is to control or regulate the amount of bypass fuel flow 96 that enters the fuel bypass plenum 90. The structure for controlling the bypass fuel flow 96 into the fuel bypass plenum 90 may include any combination of one or more control valves, throttle valves, and/or sensors known to one of ordinary skill in the art for regulating fluid flow in a system. For example, in the particular embodiment shown in FIG. 2, the structure for controlling the bypass fuel flow 96 into the fuel bypass plenum 90 is a three-way valve 98 at the fuel bypass inlet 92. The three-way valve 98 may include a combination of globe valves, gate valves, butterfly valves, ball valves, or other variable orifices known in the art for dividing or distributing fluid flow from one flow path into two flow paths. In alternate embodiments, the structure for controlling the bypass fuel flow 96 into the fuel bypass plenum 90 may include a separate throttle valve in the fuel bypass plenum 90, upstream from the fuel inlet 56, and/or downstream from the fuel outlet 58.

The various exhaust gas valves 48, 50, 72, three-way valve 98, and/or blower 60 speed shown in FIG. 2 may be manually or remotely operated. For example, one or more temperature sensors 100, Wobbe index meters 102, calorimeters, viscometers, and/or other sensors may provide signals 104 reflective of the exhaust gas 32 temperature and fuel 22 properties at various locations in the system 40. A controller 106 may receive the signals 104 and generate one or more control signals 108 to remotely control the positions of the various exhaust gas valves 48, 50, 72, three-way valve 98, and/or blower 60 speed to achieve a desired temperature and/or Wobbe index for the fuel 22. The technical effect of the controller 106 is to compare the signals 104 reflective of the exhaust gas 32 temperature and fuel 22 properties to a predetermined condition (e.g., fuel temperature, exhaust gas flow, etc.) and generate the control signal 108 for operating the various valves 64, 66, 68, 98 and blower 60 speed. As used herein, the controller 106 may comprise any combination of microprocessors, circuitry, or other programmed logic circuit and is not limited to any particular hardware architecture or configuration. Embodiments of the systems and methods set forth herein may be implemented by one or more general-purpose or customized controllers 106 adapted in any suitable manner to provide the desired functionality. The controller 106 may be adapted to provide additional functionality, either complementary or unrelated to the present subject matter. For instance, one or more controllers 106 may be adapted to provide the described functionality by accessing software instructions rendered in a computer-readable form. When software is used, any suitable programming, scripting, or other type of language or combinations of languages may be used to implement the teachings contained herein. However, software need not be used exclusively, or at all. For example, as will be understood by those of ordinary skill in the art without required additional detailed discussion, some embodiments of the systems and methods set forth and disclosed herein may also be implemented by hard-wired logic or other circuitry, including, but not limited to application-specific circuits. Of course, various combinations of computer-executed software and hard-wired logic or other circuitry may be suitable, as well.

Figure 3:
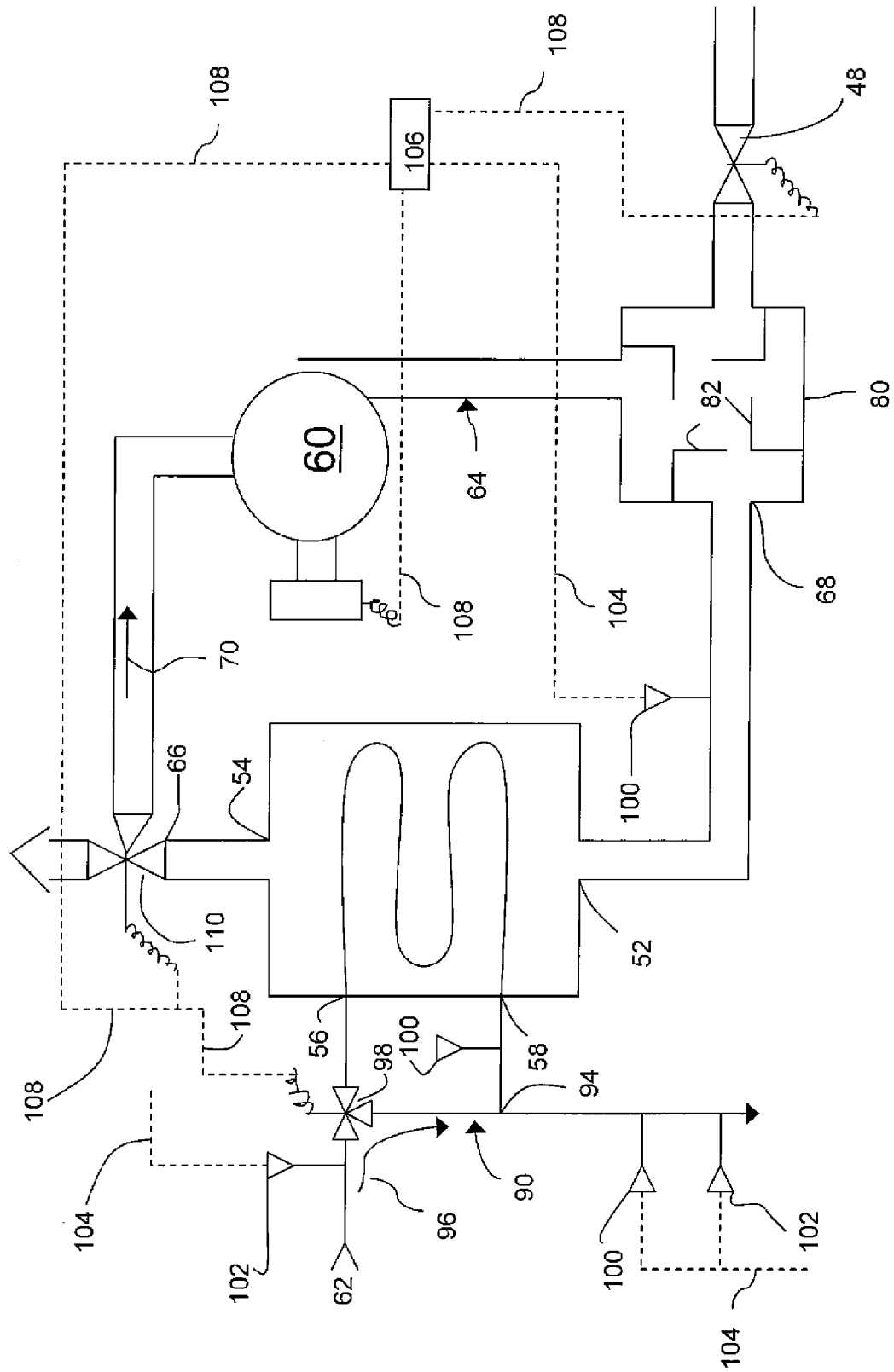
FIG. 3 is a block diagram of a system for heating combustor fuel according to a second embodiment of the present invention.

FIG. 3 provides a block diagram of a system 40 for heating combustor fuel according to a second embodiment of the present invention. The system again includes the heat exchanger 42, exhaust supply connection 44, blower 60, exhaust recirculation plenum 64, mixing plenum 80, and fuel bypass plenum 90 as previously described with respect to the embodiment shown in FIGS. 1 and 2. In this particular embodiment, however, the structure for the means for controlling the recirculated exhaust flow 70 from the exhaust outlet 54 to the exhaust recirculation plenum 64 is a three-way valve 110 at the recirculation inlet connection 66. In addition, the exhaust gases 32 that are not diverted into the exhaust recirculation plenum 64 may simply be discharged or released to the environment, rather than returned to the turbine exhaust plenum 34 or exhaust stack 36, as shown in FIGS. 1 and 2. As a result, the blower 60 may be arranged in series with the exhaust recirculation plenum 64, substantially reducing the required size of the blower 60.

The embodiments shown in FIGS. 1-3 may also provide a method for heating the combustor fuel 22 that enhances efficiency by recovering residual heat from the exhaust gases 32. The method may include, for example, flowing the exhaust gases 32 through the turbine exhaust plenum 34 or turbine stack 36 and diverting at least a portion of the exhaust gases 32 through the heat exchanger 42 downstream from the turbine exhaust plenum 34. The method may further include flowing a portion of the exhaust gases 32 through the exhaust recirculation plenum 64 and controlling or regulating the recirculated exhaust flow 70 into the exhaust recirculation plenum 64 to attemperate the exhaust gases 32 reaching the heat exchanger 42. Alternately or in addition, the method may include mixing the exhaust gases 32 with the recirculated exhaust flow 70 in the mixing plenum 80 at the recirculation outlet 68. In particular embodiments, the exhaust gases 32 leaving the heat exchanger 42 may be returned to the turbine exhaust plenum 34 and/or turbine stack 36 or released directly to the environment. In addition, the method may include bypassing a portion of the fuel 42 through the fuel bypass plenum 90 and around the heat exchanger 42.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:
1. A system for heating combustor fuel, comprising:
a turbine exhaust plenum having an exhaust supply connection;
a mixing plenum disposed downstream from the exhaust supply connection;
a heat exchanger downstream from the mixing plenum, wherein the heat exchanger has an exhaust inlet in fluid communication with the mixing plenum, an exhaust outlet downstream from the exhaust inlet, a fuel inlet, and a fuel outlet;

a blower disposed downstream from the exhaust outlet of the heat exchanger; and an exhaust recirculation plenum having a recirculation inlet connection downstream from the blower and a recirculation outlet connection fluidly connected to the mixing plenum, wherein the mixing plenum comprises a plurality of baffles downstream from the recirculation outlet connection and upstream from the heat exchanger inlet.

2. The system as in claim 1, further comprising a three-way valve disposed downstream from the blower at the recirculation inlet connection.

3. The system as in claim 1, further comprising a throttle valve disposed downstream from the blower and upstream from the mixing plenum within the exhaust recirculation plenum.

4. The system as in claim 1, further comprising an exhaust return connection between the blower and the turbine exhaust plenum.

5. The system as in claim 4, further comprising an exhaust return valve between the blower and the exhaust return connection.

6. The system as in claim 1, further comprising a fuel bypass plenum having a fuel bypass inlet upstream from the fuel inlet to the heat exchanger and a fuel bypass outlet downstream from the fuel outlet of the heat exchanger.

7. The system as in claim 6, further comprising a Wobbe Index sensor disposed downstream from the fuel bypass plenum.

8. A gas turbine comprising:
a compressor;
a combustor downstream from the compressor;
a turbine downstream from the combustor;
a turbine exhaust plenum downstream from the turbine;
a system for heating combustor fuel, comprising:
a turbine exhaust plenum having an exhaust supply connection;
a mixing plenum disposed downstream from the exhaust supply connection;
a heat exchanger downstream from the mixing plenum, wherein the heat exchanger has an exhaust inlet in fluid communication with the mixing plenum, an exhaust outlet downstream from the exhaust inlet, a fuel inlet, and a fuel outlet;
a blower disposed downstream from the exhaust outlet of the heat exchanger; and
an exhaust recirculation plenum having a recirculation inlet connection downstream from the blower and a recirculation outlet connection fluidly connected to the mixing plenum, wherein the mixing plenum comprises a plurality of baffles downstream from the recirculation outlet connection and upstream from the heat exchanger inlet.

9. The gas turbine in claim 8, further comprising a three-way valve disposed downstream from the blower at the recirculation inlet connection.

10. The gas turbine as in claim 8, further comprising a throttle valve disposed downstream from the blower and upstream from the mixing plenum within the exhaust recirculation plenum.

11. The gas turbine as in claim 8, further comprising an exhaust return connection between the blower and the turbine exhaust plenum.

12. The gas turbine as in claim 11, further comprising an exhaust return valve between the blower and the exhaust return connection.

13. The gas turbine as in claim 8, further comprising a fuel bypass plenum having a fuel bypass inlet upstream from the fuel inlet to the heat exchanger and a fuel bypass outlet downstream from the fuel outlet of the heat exchanger.

14. The gas turbine as in claim 13, further comprising a Wobbe Index sensor disposed downstream from the fuel bypass plenum.

\* \* \* \* \*